June 3, 1958     S. MEURER     2,837,067
INJECTION SYSTEM FOR DIESEL-TYPE ENGINES
Filed July 22, 1955     3 Sheets-Sheet 1

INVENTOR
SIEGFRIED MEURER,

BY *Bailey, Stephens & Huettig*

ATTORNEYS

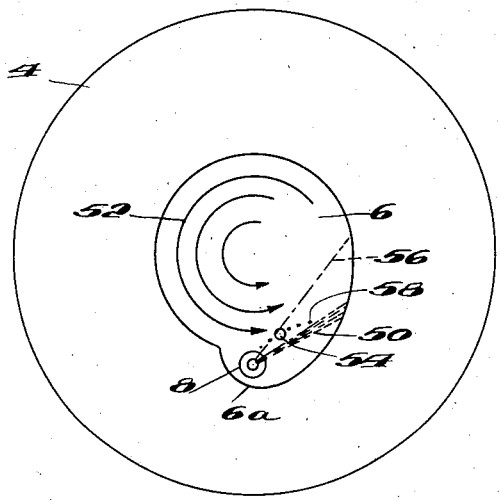
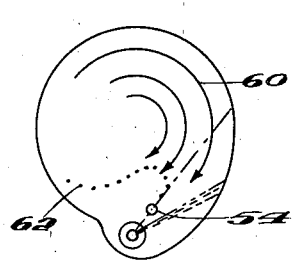
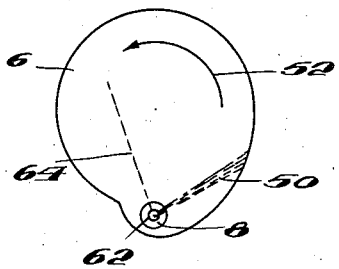
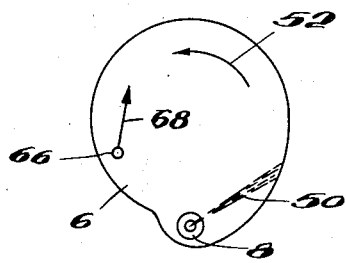
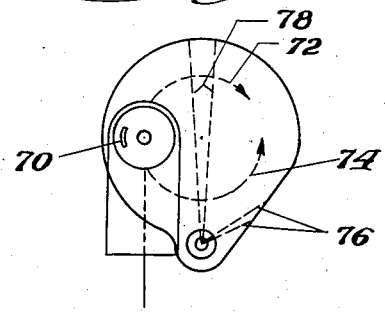

2,837,067
Patented June 3, 1958

2,837,067

INJECTION SYSTEM FOR DIESEL-TYPE ENGINES

Siegfried Meurer, Nurnberg, Germany, assignor to Maschinenfabrik Augsburg-Nurnberg, A. G., Nurnberg, Germany Application July 22, 1955, Serial No. 523,915

Claims priority, application Germany July 24, 1954

12 Claims. (Cl. 123—32)

This invention relates to an improvement in the air injection system for a diesel-type engine. In particular, the invention is directed to the supply of air to a combustion chamber through a poppet intake valve. The invention is especially adapted for use in self-ignition internal combustion engines such as disclosed in the copending application of Meurer et al., Serial No. 480,432, filed January 7, 1955, for "Operation of Internal Combustion Engines," which is a continuation-in-part of Serial No. 325,316, filed Decmebr 11, 1952, now abandoned.

The smooth running of a diesel-type engine is dependent upon the efficiency in which the air and fuel are mixed. As disclosed in the aforesaid application, Serial No. 480,432, the efficiency is improved by first depositing substantially the greater portion of the fuel on the wall of the combustion chamber, and then evaporating and burning the same.

In the cold starting of such a motor, the only fuel vaporized in the combustion chamber is that small portion which does not reach the combustion chamber wall, and this small portion is not in itself enough to cause a self-ignition start of the engine. This disadvantage might be somewhat overcome during the cold starting of the engine, by increasing the amount of fuel atomized in the air without being deposited on the combustion chamber wall above that needed for normal running of the engine so that an immediate ignition of the fuel could occur. However, in an engine as disclosed in the aforesaid application, Serial No. 480,432, an air swirl is provided which flows in the same direction as the fuel jet, and this air swirl would nullify any attempted atomization of additional fuel injected in the engine during starting because such additional fuel would be also deposited on the combustion chamber wall and then vaporized therefrom.

The objects of the present invention are to produce means for altering the direction of the fuel and/or the air swirl in the combustion chamber during the starting of a cold engine so that a complete atomization of the fuel can be obtained at the beginning in order to produce a self-igniting mixture, and to produce means for changing the direction of the fuel and/or the air swirl after the engine is started so that the engine will run as disclosed in the aforesaid application, Serial No. 480,432.

In general, these objects are obtained by injecting as much as possible of the fuel directly into the air in the combustion chamber so that it is immediately atomized and mixed with the air, rather than first depositing the fuel on the wall of the combustion chamber as disclosed in the aforesaid application, Serial No. 480,432. This is done by either, or both, varying the direction of rotation of the air swirl in the combustion chamber, or by changing the direction of the fuel jet injected into the combustion chamber. After the engine has been started, the direction of the air swirl, and/or the direction of the fuel jet are returned to normal running position in accordance with the disclosure of the aforesaid application, Serial No. 480,432.

For the purpose of cold starting, in order to increase the quantity of fuel distributed in the combustion air, the velocity of the air swirl is slowed, or even the direction reversed, so that it is opposed to the direction of the fuel jet. If necessary, the rotation of the air swirl can be stopped entirely. This is accomplished by masking the air inlet valve. By using a mask valve, the direction of rotation of the air swirl can be reversed. By pivoting the mask by 180°, the direction of rotation of the air swirl is reversed. If the mask is pivoted 90°, the air swirl will be stopped and will be considerably lessened by pivoting the mask 45°. Upon reversing the normal direction of the air swirl, the relative velocity between the fuel jet and the air becomes very high as compared to being very low when the air swirl and the fuel jet are both in the same direction. Consequently, the fuel particles in the fuel jet will not be deposited on the combustion chamber wall, but will be diverted by the air swirl along a curve toward the center of the combustion engine, the amount of curvature being determined by the kinetic energy of the fuel particles and the velocity of the air swirl. Somewhat the same effect to a lesser degree occurs if the velocity of the air swirl is slowed so that it exerts a less centrifugal force upon the fuel particles. In the above cases, the finer fuel particles are immediately atomized so that they are available for self-ignition during the starting of the engine.

The initial atomization of the fuel is also obtained by varying the direction of the fuel jet into the combustion chamber. Thus, the fuel nozzle is pivotally mounted so that the fuel jet can be directed to any part of the combustion chamber. Furthermore, a special auxiliary orifice can be given the fuel nozzle so that a separate jet of fuel is atomized in the combustion chamber during the starting of the engine. In the latter instance, it may not be necessary to pivotally mount the nozzle in certain circumstances. By using an auxiliary starting jet, sufficient fuel is supplied to the engine for the starting of the same, and once started, the engine can run with normal fuel consumption.

The means by which the objects of the invention are obtained are more fully described with reference to the accompanying drawings, in which:

Figures 6 and 7 are plan views of a piston showing the effect of the air swirl on the fuel jet in the combustion chamber;

Figures 8 and 9 are diagrammatic views showing an auxiliary jet opposed to the direction of the air swirl in the combustion chamber; and Figure 10 is a plan view showing the change in direction of both the fuel jet and air swirl.

Figure 1:
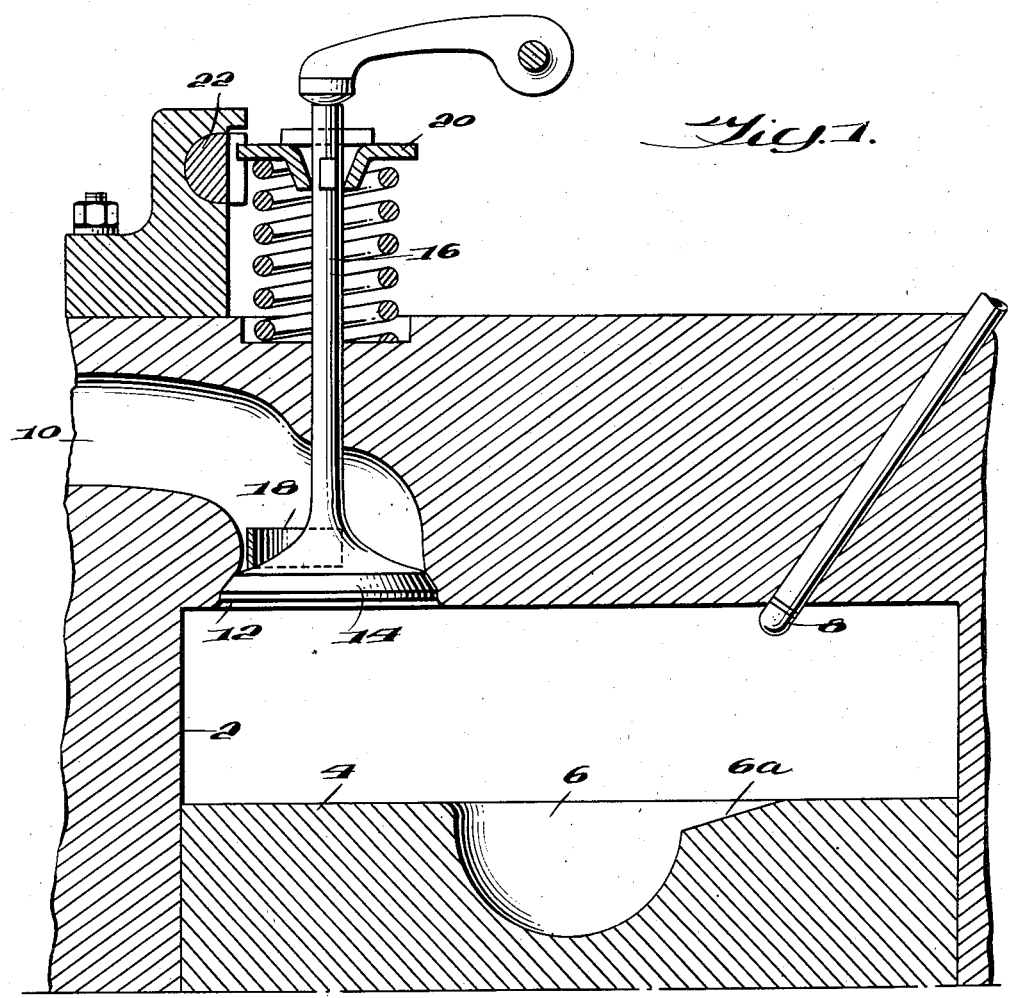
Figure 1 is a cross-sectional view of an engine embodying the invention.
Figure 2:
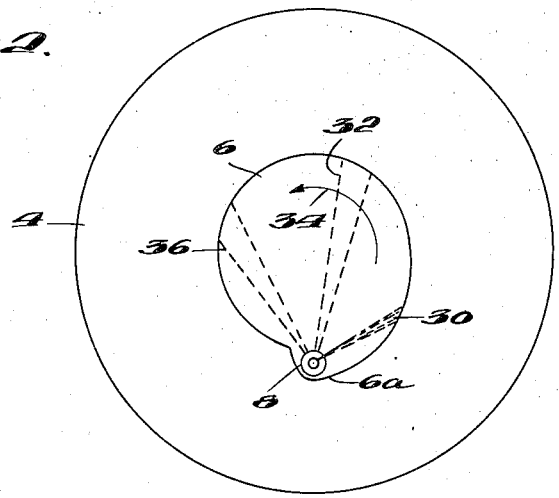
Figure 2 is a top plan view of a piston showing the direction of the fuel jet and air swirl.

In Figure 1 the engine cylinder 2 contains a piston 4, shown below top dead center, containing a combustion chamber 6. Fuel is injected into the combustion chamber through nozzle 8.

Air inlet conduit 10 is offset from the center axis of the cylinder and the fuel nozzle, and terminates in an air inlet port 12. The air inlet valve is composed of a valve head 14 and stem 16. Mounted on the under side of valve head 14 is a mask 18 which extends substantially over 45° of the valve circumference, and serves to block the flow of air past a part of the circumference of valve head 14. The position of mask 18 can be changed by rotating the valve, as by, for example, a gear 20 fixed to valve stem 16, actuated by a rack 22 mounted on the cylinder head.

Figure 3:
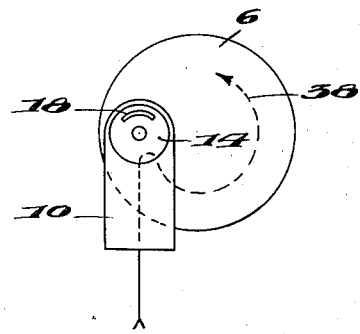
Figures 3, 4 and 5 are diagrammatic views showing the effect of pivoting the mask valve.
Figure 4:
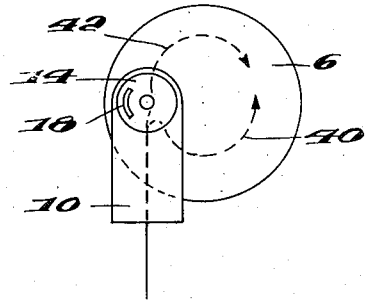
Figure 5:
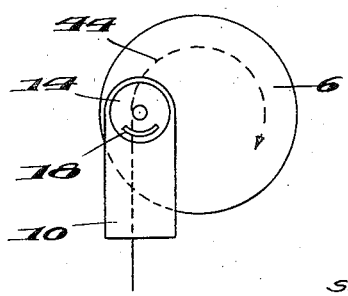

In Figure 1 the fuel is injected into combustion chamber 6 from nozzle 8, which is superimposed over notch 6a as described in the aforesaid application, Serial No. 480,432, wherein the fuel jet 30 is directed tangentially against the wall of the combustion chamber and is spread thereover as a film of fuel. The air swirl in the combustion chamber is in substantially the same direction as the fuel jet as shown by the arrow 34. The direction of the fuel jet can be varied as shown in Figures 2 and 6 to 9, inclusive, or the direction of the air swirl can be changed as shown in Figures 3 to 5. When the direction of the fuel jet is changed, it takes the direction of a chord across the combustion chamber as indicated by the dotted lines 32 and 36. If the fuel jet takes the direction indicated by lines 32, approximately 100 percent of the fuel will be atomized by the air swirl, instead of being deposited on the wall of the combustion chamber. If the fuel jet is directed according to dotted lines 36, an even more powerful atomization of the fuel will take place because the fuel is directed against the rotation of the air swirl.

The effect of the mask 18 on the direction of the air swirl is illustrated in Figures 3 to 5. In Figure 3 the mask is in the position of the normal running of the engine so that the air enters the combustion chamber substantially in the direction shown by the arrow 38. When the mask is turned 90°, as shown in Figure 4, the air can flow in either direction as indicated by arrows 40 and 42.

In Figure 5 the mask has been rotated 180° from the position in Figure 3, and consequently, the air will flow in a reverse direction as shown by arrow 44.

The effect of changing the air swirl is further illustrated in Figures 6 and 7. In the normal operation of the engine, the fuel is injected into the combustion chamber 6 from nozzle 8 in the form of a thin jet 50 and deposited on the wall of the combustion chamber. The air swirl in the combustion chamber is in substantially the same direction as indicated by the arrow 52. In the absence of the air swirl, a split-off fuel particle 54 would travel in the direction indicated by dotted line 56. However, the effect of the air swirl causes the fuel to travel along the path 58 and become impinged on the wall of the combustion chamber. However, if the direction of the rotation of air is reversed, as shown by the arrows 60 in Figure 7, the fuel particle 54 will travel in the path 62, and will be atomized in the combustion air before it has a chance to reach the wall of the combustion chamber.

Initial fuel atomization for purposes of cold starting can be obtained by means of an auxiliary fuel jet without necessarily pivoting the fuel nozzle, as shown in Figure 8. As in Figure 6, fuel is injected from nozzle 8 into the combustion chamber as a jet 50 for the normal running of the engine, this fuel jet being in substantially the same direction as the air swirl. However, a special auxiliary orifice 62 is provided in the fuel nozzle for the purpose of injecting a jet 64 of fuel into the combustion chamber during the starting of the engine, the jet 64 having a direction opposed to the direction of the air swirl. Instead of having such an auxiliary orifice, special separate nozzle means may be provided as shown in Figure 9. In this figure a separate auxiliary fuel nozzle 66 is provided in order to inject a starting fuel jet 68 in the combustion chamber in a direction transversely of, or opposed to, the direction the air swirl so that additional atomization of the fuel is obtained for starting purposes.

Figure 10 illustrates the invention in which both the fuel jet and air swirl are changed for purposes of cold starting. As in Figure 4, the mask valve 70 has been turned to the cold starting position so that the intake air enters the cylinder as two streams 72 and 74. Also the fuel jet 76 in hot running position is turned to form the jet 78 projected across the combustion chamber. Therefore, in starting the engine, fuel jet 78 is broken up and atomized by air streams 72 and 74.

Having now described the means by which the objects of the invention are obtained, I claim:

1. A method of cold starting diesel-type engines in which a jet of substantially all the fuel is first deposited as a film on the wall of the combustion chamber, vaporized therefrom by an air swirl, and then burned in the normal hot running of the engine, comprising distributing the fuel in starting the engine so that it is mixed with the air swirl instead of becoming a film on the combustion chamber wall.

2. A method of cold starting diesel-type engines in which a jet of substantially all the fuel is first deposited as a film on the wall of the combustion chamber, vaporized therefrom by intake air in the form of an air swirl, and then burned in the normal hot running of the engine, comprising distributing the fuel in starting the engine so that the greater portion of the fuel is mixed with the intake air instead of becoming a film on the combustion chamber wall.

3. A method as in claim 2, further comprising distributing said fuel by directing it across the flow of intake air.

4. A method as in claim 2, further comprising distributing said fuel by directing the intake air and fuel in opposed directions.

5. A method as in claim 2, further comprising distributing said fuel by reducing the velocity of the intake air.

6. A method as in claim 2, further comprising distributing said fuel by directing the intake air swirl in a direction opposed to the fuel direction.

7. A method as in claim 2, further comprising distributing said fuel by discharging it from an auxiliary starting fuel jet.

8. In a compression ignition engine having cylinder and piston structures, constructed and arranged to provide a combustion space, in which fuel is to be ignited, means for creating swirling movement of air in said combustion space, means including an injection nozzle for injecting liquid fuel into said combusiton space, said nozzle being oriented to discharge fuel generally tangentially of a wall of said combustion space to form a film of liquid fuel thereon, and being positioned a short distance from a near point of impingement of the injected fuel on said wall to minimize the atomization of fuel, and means for pivoting said nozzle for impinging the injected fuel during cold starting of the engine on a point of the wall more remote from the nozzle than said near point.

9. In a compression ignition engine having cylinder and piston structures constructed and arranged to provide a combustion space in which fuel is to be ignited, means for creating swirling movement of air in said combustion space, means including an injection nozzle for injecting liquid fuel into said combustion space, said nozzle being oriented to discharge fuel generally tangentially of a wall of said combustion space to form a film of liquid fuel thereon, and being positioned a short distance from a near point of impingement of the injected fuel on said wall to minimize the atomization of fuel, and means for pivoting said nozzle for impinging the injected fuel during cold starting of the engine toward the center of the combustion space.

10. A compression ignition engine having cylinder and piston structures constructed and arranged to provide a combustion space in which fuel is to be ignited, means for creating swirling movement of air in said combustion space, injection means comprising a nozzle for injecting liquid fuel into said combustion space, said nozzle being oriented to discharge fuel generally tangentially of a wall of said combustion space to form a film of liquid fuel thereon and being positioned a short distance from a near point of impingement of the injected fuel on said wall to minimize the atomization of fuel, and a main fuel jet orifice and an auxiliary fuel jet orifice in said nozzle, the latter orifice being effective to inject fuel against the air swirl movement during starting the engine.

11. A compression ignition engine having cylinder and piston structures constructed and arranged to provide a combustion space in which fuel is to be ignited, means for creating swirling movement of air in said combustion space, means including a main injection nozzle for injecting liquid fuel into said combustion space, said main nozzle being oriented to discharge fuel generally tangentially of a wall of said combustion space to form a film of liquid fuel thereon and being positioned a short distance from the point of impingement of the injected fuel on said wall to minimize the atomization of fuel, and an auxiliary nozzle separated and spaced from said main nozzle to inject fuel against the air swirl movement for starting the engine.

12. In a compression ignition engine having a cylinder and a piston, a mask valve for introducing air into said cylinder and simultaneously imparting to such air a swirling motion about the cylinder axis, said piston having a combustion chamber communicating with the cylinder through an opening whereby the swirling air, when compressed, will be introduced in the combustion chamber, means including an injection nozzle for injecting liquid fuel into said combustion chamber, said nozzle being oriented to direct the fuel it discharges toward the wall of the combustion chamber to form a film thereon, and means for pivoting said mask for changing the flow of air to atomize said fuel during starting of the engine.

References Cited in the file of this patent

FOREIGN PATENTS

| 448,159 | Germany | Aug. 10, 1927 |
| 79,068 | Sweden | May 12, 1932 |